Aug. 11, 1953  J. YARMAK  2,648,530
COMBINED SHEARING AND LOADING MACHINE
Filed June 9, 1948  5 Sheets-Sheet 1

Inventor:
Julius Yarmak

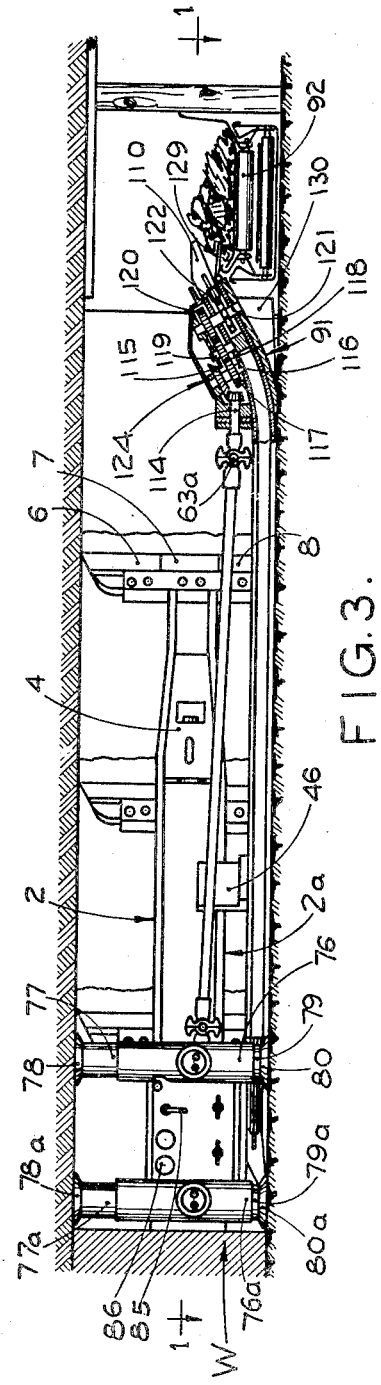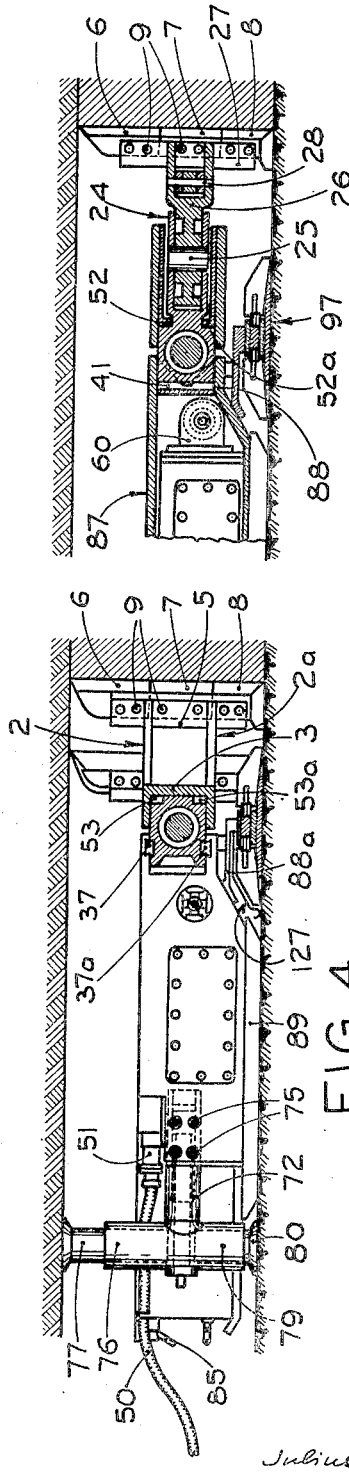

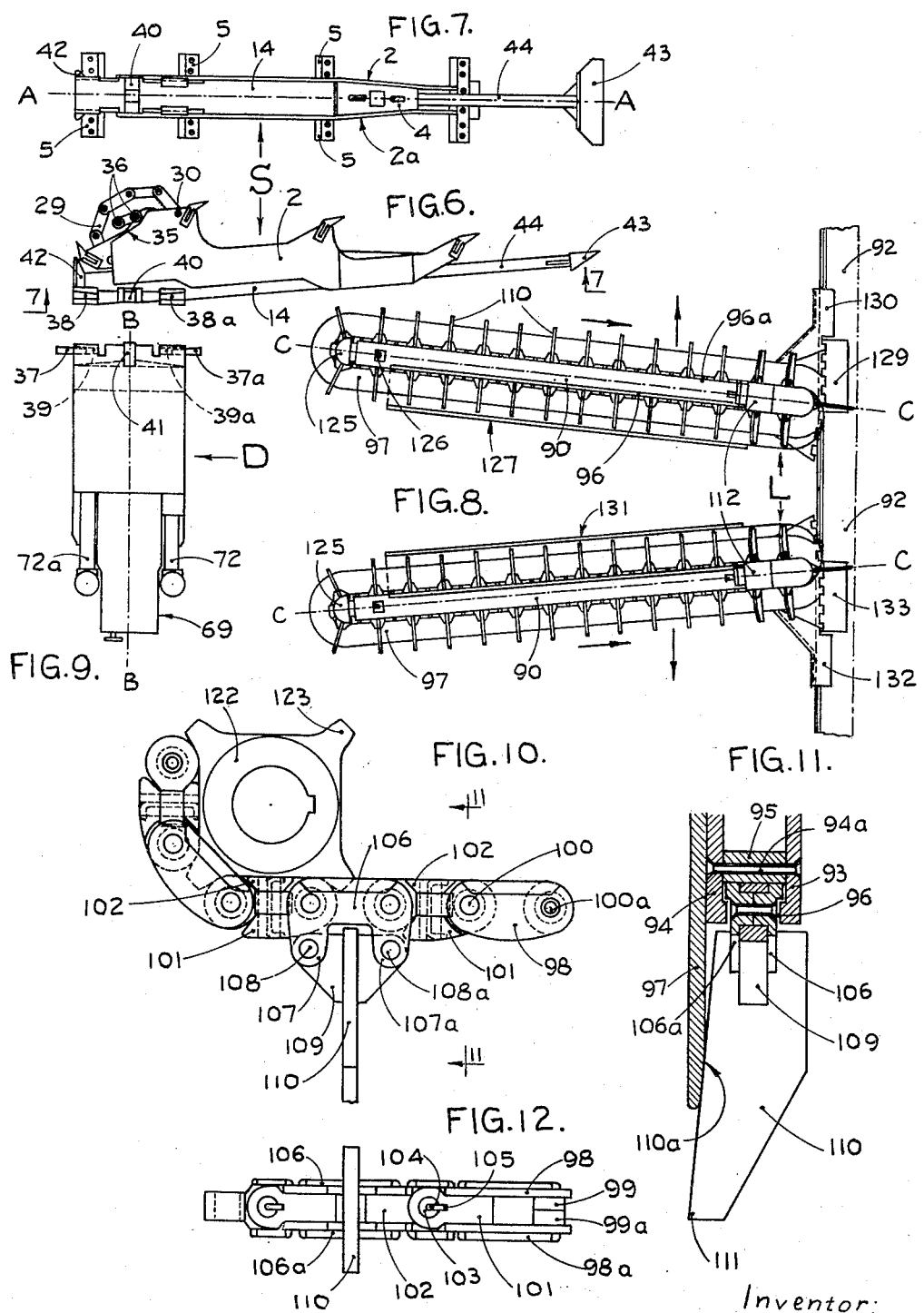

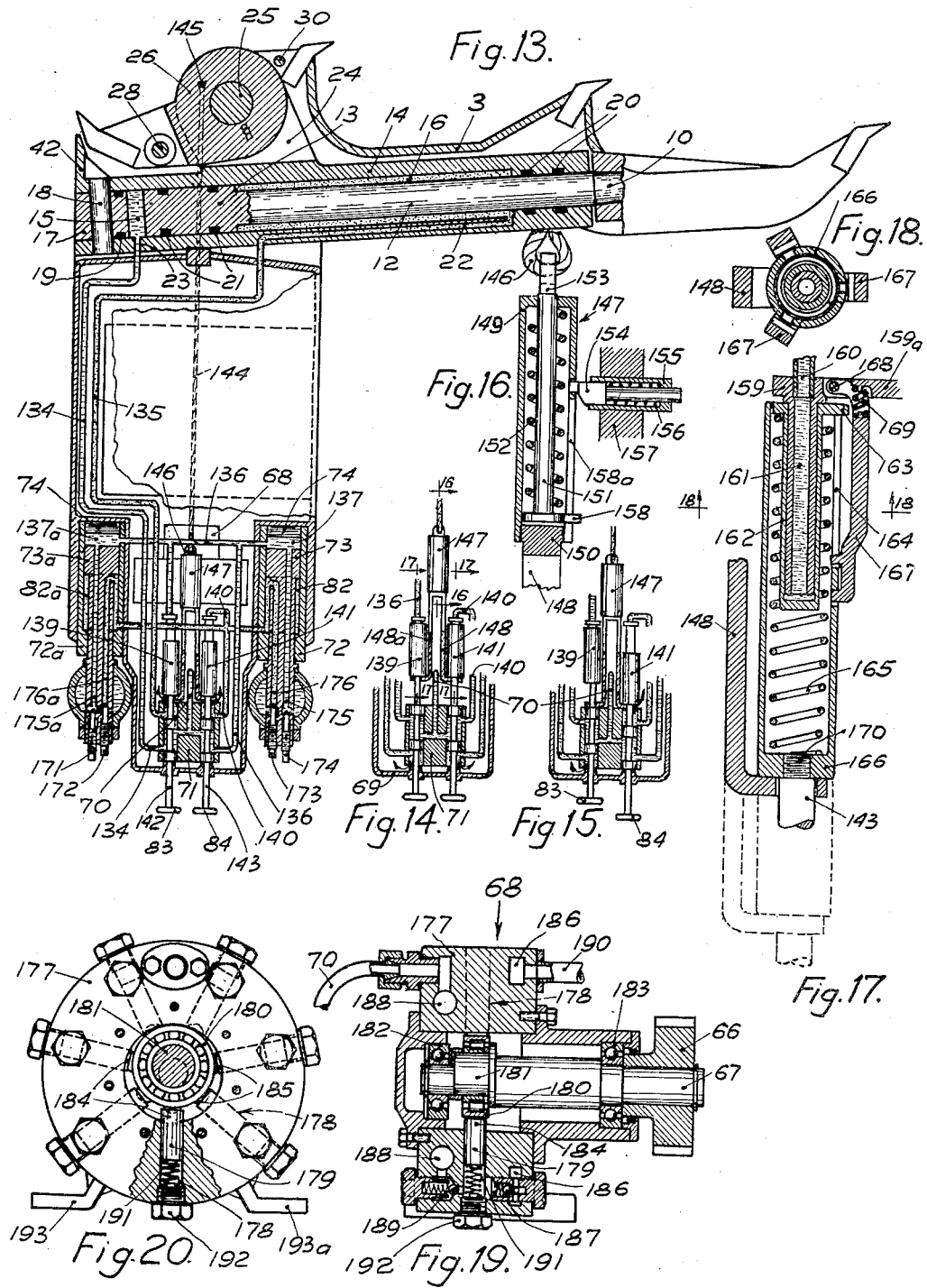

Aug. 11, 1953   J. YARMAK   2,648,530
COMBINED SHEARING AND LOADING MACHINE
Filed June 9, 1948   5 Sheets-Sheet 5
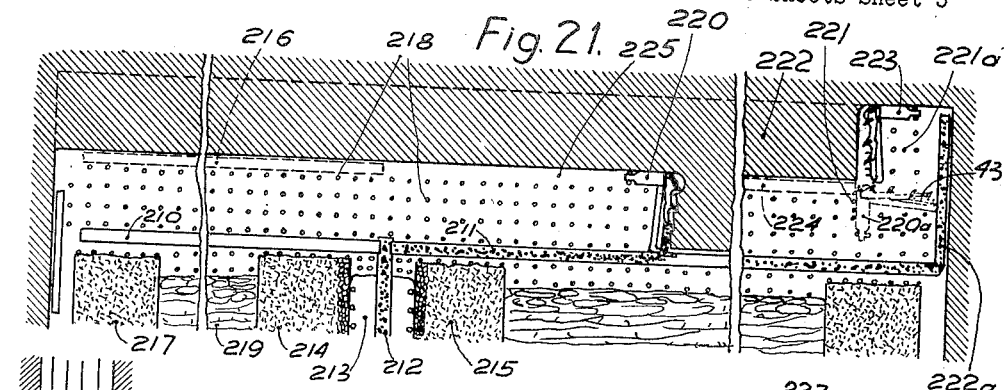
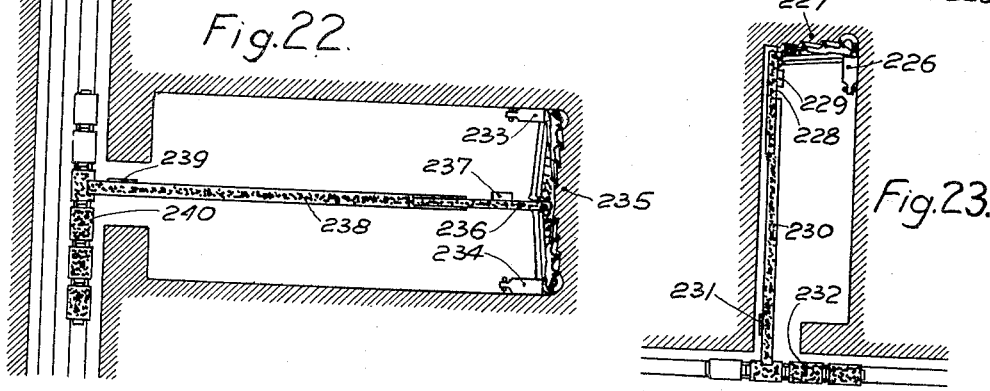
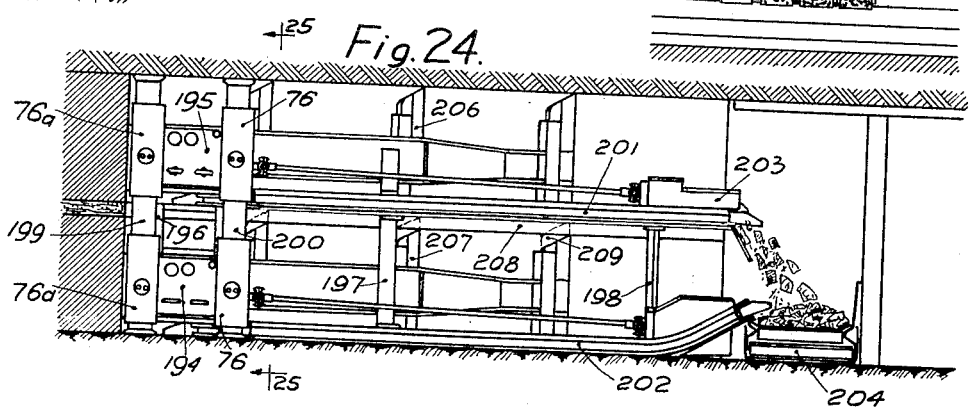
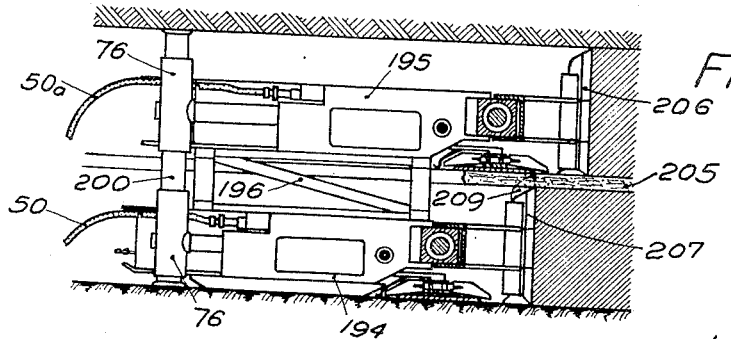
Inventor:
Julius Yarmak Patented Aug. 11, 1953

2,648,530

UNITED STATES PATENT OFFICE 2,648,530

COMBINED SHEARING AND LOADING MACHINE

Julius Yarmak, Wakefield, Yorkshire, England

Application June 9, 1948, Serial No. 31,996
In Great Britain July 8, 1947

6 Claims. (Cl. 262—8)

This invention refers to combined shearing and loading machines, for mining coal and like minerals, which machines are adapted to sever coal or other minerals, from the working face of a seam, in front of which the machines are placed, by a direct shearing action of several large chisels or wedge shaped blades, and which machines are adapted to load the coal or other minerals, separated from working face and reduced to reasonably small pieces, on to a face conveyor by means of an intermediate loading conveyor, or by other suitable loading equipment.

The paramount object of the invention is to provide a mining machine by which all severed and mined from the seam coal or other mineral becomes, during one operation, a loosely packed mass of desirably sized medium large pieces which are the most convenient from the conveying point of view as well as for use, and without inclusion of small cuttings and too large lumps.

The above object is achieved without the employment of cutting, drilling or sawing devices involving quickly moving small cutting bits or picks, which would unavoidably crush the coal or other mineral to powder-like cuttings and produce dust, and without employment of high powered and fast moving cutter chains, discs, drums or borers which could comprise potential danger. Shotfiring at the coal face is also avoided. A small number of large and comparatively slowly moving direct shearing chisels, blades or other wedge shaped tool elements only are used in the machine.

Another object is to provide a mining machine capable of attacking for mining the entire area of the end or buttock of a broad strip of the seam on its full width and to full height of the seam at once. The mined strip can be several times wider than the height of the seam worked, and the machine can be applied both in a longwall face and in a room mining in thin and thick seams.

A further object is to provide a method and means for a safe support of the shearing and loading mining machine against the large shearing forces involved. This is achieved by thrusting the machine on the solid and undisturbed coal or other mineral in the seam.

The full cycle of operations performed by the machine during a mining process comprises three strokes or moves. The first stroke is the advancement of the machine one step forward toward the working face. The second stroke is the actual shearing off or severance of coal or other mineral from a seam. The third stroke is the retraction of the various hydraulic rams to their starting position and moving back the shearing tools. The cycle of strokes being controlled automatically and applied continuously during running of the driving motor and can last during the whole working time of a shift or through the full length of the strip to be mined.

The loading conveyor of the machine works continuously and thus picks up from the floor of seam on full width of the strip the loose pieces of coal sheared off and fallen down on the ground and loads the coal on to a face conveyor uninterruptedly during all three strokes, i. e. whilst the machine is advancing, whilst the shearing action is being performed, and whilst the shearing tools are being retracted. Therefore, the flow of coal from the machine is continuous and uninterrupted in spite of cyclic operation of the machine.

Safety and general conditions of mining work, by using machines according to this invention will improve considerably in comparison with other present well-known machines and systems of mechanisation for mining coal and other minerals, because of features described above.

The roof supporting props may be set very near to the working face when the machine is working, and there is no need for any removal of the props during working once they have been set. All work at the machine during shearing and loading operation, as well as during the turning of the machine for opposite run in longwall face mining is always performed in the inner corner of the coal face in which the roof is supported at least from two sides by solid seam.

Still further objects, advantages and features of the machine constructed in accordance with the invention will appear later on from the detailed specification.

The invention will now be described in detail as an example of embodiment and with reference to the accompanying drawings in which:

Fig. 3 is a rear end elevation of the machine shown in the coal seam and with a part section along the line 3—3 of Fig. 1.

Fig. 4 is a side elevation of the machine with a section along the line 4—4 of Fig. 1.

Fig. 5 is a vertical cross section along the irregular line 5—5 in Fig. 2.

Fig. 6 is a plan view of the detached shearing portion of the machine.

Fig. 7 is a view in the direction of arrows 7—7 of Fig. 6.

Fig. 8 is a plan view of the loading conveyor shown detached from the machine and assembled for working on either a right hand or left hand face.

Fig. 9 is a plan view of the driving and propelling portion of the machine with the shearing and loading portion detached, and indicating the connecting wedges.

Fig. 10 is a plan view of the conveyor driving sprocket showing a portion of the scraper chain with a flight.

Fig. 11 is a section along line 11—11 of Fig. 10 showing a part of conveyor structure with the scraper chain and cantilever flights.

Fig. 12 is a front elevation of the scraper chain shown in Fig. 10.

Fig. 13 is a diagrammatic plan view of both the propelling and shearing portions of the machine, shown partly in section and indicating the arrangements of the hydraulic system. The automatic control valves are shown in positions for the shearing or forward stroke.

Fig. 14 is a plan view of the control valves of Fig. 13, but in next position, i. e. adapted to retract the rams.

Fig. 15 is a similar view to Fig. 14 but showing the valves in next positions, i. e. for machine advancing.

Fig. 16 is an enlarged longitudinal section along lines 16—16 of Fig. 14.

Fig. 17 is an enlarged longitudinal section along lines 17—17 of Fig. 14.

Fig. 18 is a cross section along line 18—18 of Fig. 17.

Fig. 19 is a section view of the hydraulic pump.

Fig. 20 is an end elevation of the hydraulic pump with a portion indicated in section.

Fig. 21 is a plan view showing the machine in a longwall system of mining.

Fig. 22 is a plan view showing a method of operating two machines in one room.

Fig. 23 is a plan view showing a chamber or room worked by one machine.

Fig. 24 is a vertical section through a seam having a central band of dirt, and showing a double machine.

Fig. 25 is a vertical section along line 25—25 of Fig. 24.

Figure 1:
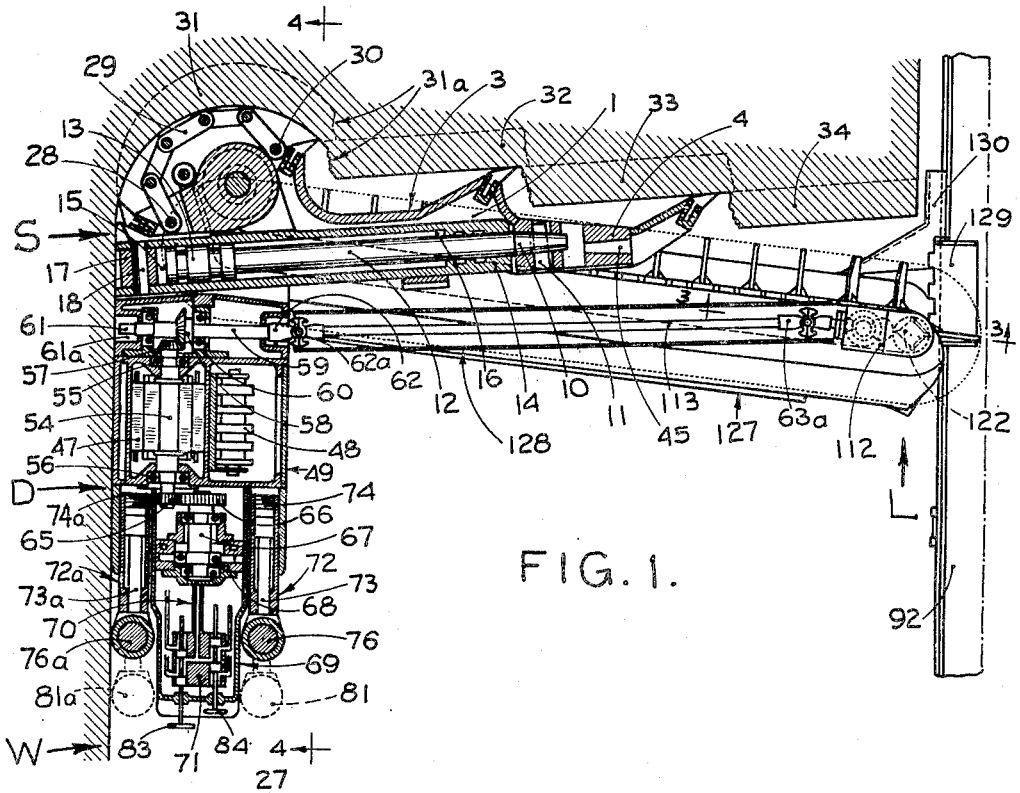
Fig. 1 is a sectional plan view taken along the line 1—1 of Fig. 3, indicating the combined shearing and loading machine in working position at the commencement of a shearing stroke.
Figure 2:
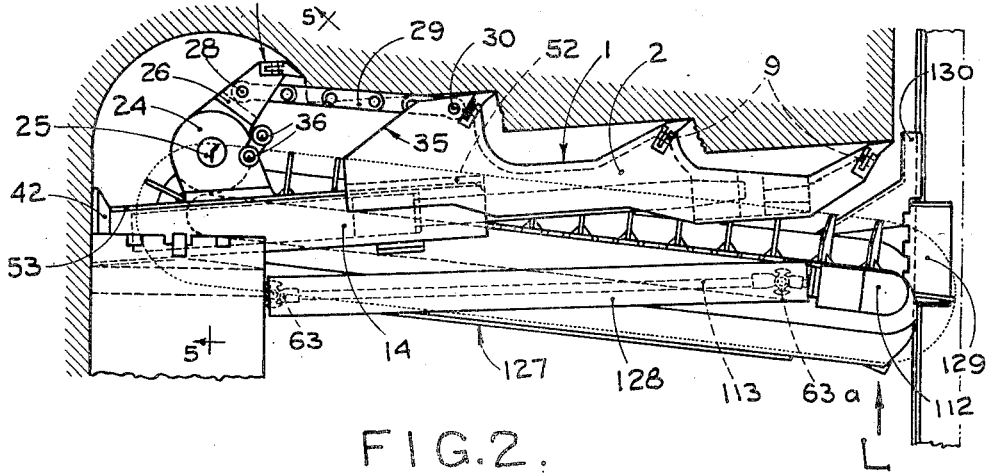
Fig. 2 is a part plan view showing the frame in extended position, i. e. at the completion of a shearing stroke.

The combined shearing and loading machine comprises in general three main portions or units which are easily separable and each of which is adapted to perform its own functions, namely, the driving and propelling portion D (Figs. 1 and 9), the shearing mechanism S (Figs. 1, 6 and 7) and the loading portion L (Figs. 1, 2 and 8).

The shearing mechanism S (Figs. 1, 2, 4, 6 and 7) incorporated in the forward portion of the machine structure comprises a slidably mounted frame 1 preferably of a welded construction consisting of two horizontal steel plates 2 and 2a, a vertical wall 3 and a boss portion 4. The frame is provided with three lugs 5 projecting in front of the machine structure and extending both above and below the frame. To each lug 5 are attached several superposed wedge shaped tool elements forming one separate substantially vertical shearing edge. In this construction each shearing edge comprises three wedge shaped blades, upper blade 6, centre blade 7 and lower blade 8. The three blades are secured to each lug 5 by bolts 9 comprising means adapted for readily detachment and replacement of each blade when required.

The frame 1 is firmly attached by means of tapered bore, receiving tapered portion 10, and cotter 11 to the hydraulic ram comprising a piston rod 12 and a double acting piston 13 in hydraulic cylinder 14. During shearing action, oil under pressure is admitted into space 15, and withdrawn from space 16, whilst during the retracting operation oil is admitted into the space 16 and withdrawn from space 15. The hydraulic cylinder 14 is closed at its rear end by a plug 17 retained in position by pins 18 and provided with a packing 19 (Fig. 13) to prevent the escape of oil. Other packings 20 are provided to prevent the escape of oil along the piston rod. The piston 13 is also provided with two packings 21 (Fig. 13). Conduits 22 and 23 are provided in the walls of cylinder 14 for the admission and withdrawal of oil to and from each side of the piston 13 as required.

On the forward side of cylinder 14 is formed a double bracket 24 carrying a substantially vertical axle 25 on which the arm 26 is pivotally mounted being located thus within one of the two forward corners of the complete machine structure (in this case within the left hand corner). The arm is provided at its extremity with a lug 27 (Fig. 5) to which the three shearing blades 6, 7 and 8 are attached. The blades are similar to those already mentioned and attached to lugs 5 (Fig. 4). The arm 26 is provided with a bolt 28 mounted in a bore located between the pivot 25 and the extremity of the arm for anchoring one end of the chain 29, the other end of which is secured to the plates 2 and 2a of frame 1 by means of bolt 30. It will be understood that whilst the frame 1 is moving across the machine forward or for shearing stroke, the arm 26 too, with its shearing blades is forced by pull of the chain cable 29 to pivot through an arc in a horizontal plane, and in so doing it shears off a sickle shaped paring 31 in the inner corner formed by a side wall of the solid seam and the front of a working face, and forms in this way the first step 31a of the parings whilst the other shearing edges of frame 1 continue the shearing off on the previously prepared steps of parings 32, 33 and 34 respectively. This process is repeated each time the frame is operated.

After reaching its extreme extended position as shown on Fig. 2 the frame 1 commences to move back across the machine. The arm 26 is pivoted back simultaneously by the contour 35, formed on plates 2 and 2a (Figs. 2 and 6) thrusting on four rollers 36 attached to the arm 26. When arm 26 is pivoted back in its second extreme position within the corner (Fig. 1) the chain 29 lies loosely around the pivot boss of arm 26. Thus the shearing edge on lug 27 attached to the arm 26 commences its shearing action after those on the frame 1 due to the slackness in chain 29 which must be taken up before movement and power can be transmitted to the arm 26. Therefore, before the arc shearing by arm 26 commences, the machine is firmly pressed on the side vertical wall W (Figs. 1 and 3) of solid coal or other mineral in the seam.

The shearing mechanism S as a unit is connected to the driving and propelling portion D by means of four wedges 37 and 37a which are inserted into corresponding slots 38 and 38a formed in the wall of cylinder 14 and slots 39 and 39a formed in plates 87 and 88 of driving portion D (Figs. 4, 5, 6 and 9). For rigidity of the connection there is provided a slot 40 on the rear side of cylinder 14 into which is inserted the projecting portion 41 of the driving and propelling portion D. The cylinder 14 comprising the main part of the reciprocating means for all shearing edges is provided at its rear end with a substantially vertical rigid plate forming a foot 42 comprising a continuation of the side surface of machine body to thrust upon the side wall of solid coal in the seam for supporting the machine against the shearing forces. Provisions are made for fitting an additional shearing wedge 43 (Figs 6 and 7) to the frame 1 by means of a rod 44 inserted into tapered hole 45 of boss portion 4. The shearing wedge 43 projects beyond the tip of the loading conveyor L and is adapted for use when the machine is working in a room or when working out a stable hole in the longwall face mining.

For additional support the frame 1 is provided with two brackets 52 and 52a (Figs. 2, 4 and 5) adapted to slide in recesses 53 and 53a of cylinder 14.

The shearing mechanism or unit S having a horizontal plane of symmetry A—A (Fig. 7) for fitting the unit to the machine in two ways to suit either a right hand or a left hand working face of a mine. The easily detachable and changeable blades 6 and 8 of the shearing edges (Figs. 4 and 5) are adapted to accommodate the machine to different thickness of seam by choosing their length as required to cover within practical limits the full height of the seam worked.

Connection between the conveying portion L and the shearing mechanism S is by means of a bracket 46 (Fig. 3).

The driving and propelling means included in the portion or unit D comprises an electric motor 47 (Fig. 1) controlled by switch 48, both of which are enclosed in a common flameproof enclosure 49.

Electric power is supplied to the motor by means of a flexible trailing cable 50 (Fig. 4) which enters the motor and switch enclosure through a flameproof type cable plug 51, in a similar manner to that adopted for coalcutters or other mining machines.

The rotor shaft 54 is journalled in anti-friction bearings 55 and 56. On the forward end of the motor shaft a bevel pinion 57 is keyed which meshes with and drives the bevel gear 58 mounted securely on the cross shaft 59. The cross shaft is rotatably supported in two anti-friction bearings mounted in their housing 60 (Figs. 1 and 5). Both ends 61 and 62 of the cross shaft lie in recesses 61a and 62a and are splined to receive the universal joint 63 of the transmission driving the loading conveyor.

On the second end of the rotor shaft 54 a gear pinion 65 is keyed which meshes with and drives the gear 66 mounted drivingly on the eccentric shaft 67 of a hydraulic pump 68. The housing 69 of the driving unit serves also as an oil container.

At each side of the housing 69 a double-acting horizontally arranged hydraulic cylinder 72 or 72a with rams 73 or 73a is attached by means of bolts 75 (Fig. 4). The forward end of each cylinder is closed by threaded plug 74 or 74a. Each said ram 73 or 73a is provided with a vertical hydraulic prop 76 or 76a each comprising a cylinder and two independent plungers, the upper of which 77 or 77a carries a cap 78 or 78a and the lower of which 79 or 79a carries a foot 80 or 80a.

When oil under pressure is admitted into the two horizontal cylinders, it is simultaneously fed through suitable passageways in rams 73 and 73a into the vertical hydraulic props 76 or 76a. Said horizontal cylinders with rams and the vertical props thus form a group of rams interconnected hydraulically. Hence the props are extended and jammed firmly between the roof and floor of the seam. Further supply of oil under pressure will cause extension of the rams 73 and 73a which will push the whole machine forward, thrusting on the props 76 and 76a which will then occupy relative positions 81 and 81a (Fig. 1, dotted lines). After that and due to the automatic actuating of control valves oil is allowed to escape free from the prop cylinders and simultaneously is admitted under pressure to the spaces 82 and 82a (Fig. 13). Thus the caps 78 and 78a fall out of contact with the roof, props become free and the rams 73 and 73a are retracted, pulling props 76 and 76a to their starting position at the machine again. In this way step-by-step propelling of the machine is performed by means of the above-described mechanism.

At the rear end of the machine housing 69, from which point the machine is operated, handles 83 and 84 are provided for hand operated control of the hydraulic valves, if required, in addition to the automatic control. Handle 85 is adapted for operating the switch of the electric motor 47. Instruments 86 are provided to indicate the working pressure of the oil, its temperature and level.

At the forward end of the driving and propelling portion two plates 87 and 88 (Figs. 4, 5 and 9) project which are adapted for fitting the shearing unit of the machine by means of four wedges 37 and 37a as was mentioned previously. The driving and propelling portion D, as a unit, is symmetrical about the central vertical plane B—B (Fig. 9) for fitting the other portions of the machine in two ways to suit either left or right hand working face. The unit is supported on the floor of the seam by means of sledge 89 (Fig. 4) which may be of various heights as required for accommodation to the various thicknesses of seams worked, by lifting the machine body to the middle of the seam thickness.

Loading conveyor L is of well known scraper chain type. The conveyor comprises an elongated frame 90 (Fig. 8) the discharging end 91 of which is curved upwards to the height of the loading edge of a face conveyor 92 (Fig. 3). The frame consists of an upper guiding plate 93 (Fig. 11), a lower guiding plate 94, and two longitudinal guiding bars 95, which are connected together by rivets 94a. Two grooves 96 and 96a (Fig. 8) are thus formed along which an endless scraper chain runs. The conveyor rests on the floor of the seam by means of plate 97 comprising base for the whole conveyor structure.

The scraper chain of the conveyor is provided with pivot joints in two planes at right angle. The chain comprises double links 98 and 98a having round journals 99 and 99a, each pair of the links being connected together by two rivets 100 and 100a. Such links provide flexibility in a horizontal plane. Other kind of chain links comprising lugs 101 and 102 connected pivotally by a pin 103 held in position by a piece of round steel wire 104, having its ends 105 bent over, provide flexibility in a vertical plane.

Each alternate pair of links 106—106a is provided with bifurcated projections 107 and 107a to which a boss portion 109 of cantilever scraper flight 110 is attached by means of rivets 108 and 108a. The flights bear on the conveyor plate 97 at the centre of their rib portions 110a, but the tips 111 project forward and slope down to the floor level to pick up and sweep clear all material in front of the conveyor reaching the inside corner of the working face.

The conveyor chain is driven by gear assembly 112 (Fig. 1) mounted on the inclined end 91 of the conveyor frame (Figs. 3 and 8). The power is transmitted from the motor to the bevel pinion 114 of the gear assembly 112 through an intermediate shaft 113 with two universal joints 63 and 63a enclosed in casing 122 (Figs. 1, 2 and 3). The bevel pinion 114 meshes with and drives the bevel gear 115 which is drivingly mounted on the shaft 116. On the same shaft spur gear pinion 117 is keyed which drives an idler 118 mounted on its shaft 119. The idler drives a spur gear 120 with the shaft 121 on which a chain driving sprocket 122 is keyed. The sprocket has four teeth 123 (Fig. 10) by which it engages the conveyor chain. All gears of the conveyor drive are enclosed in housing 124 containing a lubricant.

The second or tail end of the conveyor is provided with a slidable part 125 (Fig. 8) which can be adjusted lengthwise relative to the conveyor frame by screw 126 for regulating the tension of the conveyor chain.

In working position the return side of the conveyor chain is covered by shield 127, and for discharging the coal on to the face conveyor a pivotal chute 129 is provided. A sloping down sheet guard 130 which is firmly attached to the conveyor plate 97 protects the face conveyor. Pieces of coal fallen down between the machine and the face conveyor 92 are pushed by the shearing blades on the sloping sheet guard 130 up to the edge of, and thus loaded on to, the face conveyor without imposing any pressure against the conveyor.

The loading conveyor portion or unit L is attached to the driving portion D by means of bracket 88a (Fig. 4) and to the shearing unit S by means of bracket 46 (Fig. 3).

The loading conveyor mechanism L is symmetrical about a central vertical plane C—C (Fig. 8) for adapting the conveyor to a right hand or a left hand working face. Shield 131 or shield 127 (Fig. 8), the protecting sheet guard 130 or 132 and chute 129 or 133 are to be attached to the conveyor depending upon whether right or left hand working face is to be accommodated.

Oil under high pressure is the main means for transmitting power from the driving motor to the various hydraulically operating parts of the machine and is supplied by pump 68 (Figs. 1 and 13). The pump works continuously, draws oil from the container 69 and delivers it under pressure through supply conduit 70 to the two reversing valves in parallel which valves are of the sliding piston type and are operating in a valve block 71. From the valve block 71 run four pipes or conduits. Conduit 134 runs to the extending end 15 of the shearing cylinder 14, and conduit 135 runs to the opposite or retracting end 16. Conduit 136 runs to the extending ends 137 and 137a of the two horizontal propelling cylinders 72 and 72a and also to the device 139 for automatic shifting of the valve. Conduit 140 runs to the opposite or retracting side 82 and 82a of rams 73 and 73a and to the second device 141 for automatic shifting of the second valve.

In all these four pipes or conduits 134, 135, 136 and 140, oil flows in either direction depending upon the valves setting at a particular instance. Oil flowing back towards the valve block is discharged from each conduit back into container 69 through axial ports in valve block 71 (as shown by arrows in Figs. 13, 14 and 15).

Operating of the rams is performed in cycles of three subsequent strokes or moves comprising extension of machine propelling rams for advancement, extension of the shearing ram for shearing stroke and retraction of all rams. Controlling of the operation is repeated automatically and continuously.

During the shearing stroke (Fig. 13), supply conduit 70 is connected through conduit 134 with the space 15 of shearing ram 14, and simultaneously through conduit 136 with the propelling rams 73 and 73a and thereby with the hydraulic props or jacks 76 and 76a too. All said cylinders are therefore under pressure simultaneously, but during this position only the shearing ram 12 is operating, because the props 76 and 76a are still firmly wedged between the roof and floor and the propelling rams 73 and 73a are still in their extended positions since the preceding move was an advancement of the machine. The whole machine is therefore held firmly during the shearing action being pressed to the side wall by shearing forces and anchored to the roof and floor of the seam by the jacks and propelling rams.

At the end of the stroke when the shearing frame 1 has reached a limit of extension, both piston valves 142 and 143 are shifted automatically in the new position by a spring device 147 (Fig. 14) preloaded by pull of a flexible cable 144, one end 145 of which is attached drivingly to the shearing arm 26 and the other end 146 is secured to the device.

The new position of control valves comprises the retraction of all rams.

During this stroke the supply conduit 70 (Fig. 14) is connected through conduits 135 with space 16 of cylinder 14 to retract the ram 12 and move back the frame 1. Simultaneously oil under pressure is admitted to the spaces 82 and 82a of the propelling rams 73 and 73a, via conduit 140, to retract them and pull both props 76 and 76a back to the machine. Oil from the space 15 of shearing cylinder 14 and from spaces 137 and 137a of propelling cylinders 72 and 72a is allowed to escape free through conduits 134 and 136 and control valve block 71 back into container 69.

Such a position of the valves is maintained until all said rams are fully retracted and oil pressure rises to a predetermined limit. The piston valve 143 is then pushed back on the instant to its second position by the spring device 141 operating automatically by the increased oil pressure. The valves are thus set for the next move comprising advancement of the machine.

During this stroke, oil under pressure is still admitted to the space 16 to retain the shearing ram in the retracted position, but oil under pressure is now also admitted through conduit 136 to the ends 137 and 137a of propelling cylinders and simultaneously through bores 175 and 175a to both vertical hydraulic props or jacks. The props extend and become wedged between the roof and floor and the machine is advanced forward. When the shearing blades come in contact with the coal in the seam, and therefore the advance of the machine is hindered the pressure of oil supplied by the pump will rise to a predetermined limit, the second valve 142 is pushed back by the second spring device 139 which is connected with conduit 136 and is operating automatically by the rise of oil pressure.

With the last valve setting the full cycle of operations is completed. The valves are again in the position for the next shearing move (Fig. 13).

The spring device 147 (Fig. 16) comprises a tubular housing 149 in one end of which a plug 150 provided with two extension lugs 148 and 148a is screwed. Each said arm engages one of the valves 142 or 143. Inside the tubular housing a slidable bolt 151 carrying a spring 152 is journalled. To a lug 153 at one end of the bolt a cable 146 is secured. At the completion of a shearing stroke the shearing arm 26 is pulling the cable 146 and the bolt 151 thus applying a force to the housing 149 through a spring 152. However, the housing 149 is retained in position by a plunger 154 of a latch engaging the housing and mounted slidably at right angles to the pulling force. A tube 155 is securely mounted in wall 157 and contains a spring 156 by which the plunger 154 is loaded. When the projecting part 158 of the bolt 151 moving along the slot 158a will reach the tapered portion of plunger 154 the plunger will be pushed out of engagement with the housing 149 which is then free and is moved by the force of the compressed spring 152 shifting simultaneously both valves 142 and 143 to the new position without interruption of the cycle of operations.

Action of spring device 139 or 141 (Figs. 17 and 18) is similar to that described above but is operated hydraulically. Each said device comprises a hydraulic plunger 159 attached immovably to the machine housing wall 159a. Oil under pressure is admitted through conduit 160 comprising continuation of the conduit 136 or 140 respectively communicated with extension and retraction sides of the propelling rams and through bore 161 of the plunger. On the plunger 159 a cylinder 162 is slidably mounted. The cylinder is provided on the collar with three portions 163 projecting through slots 164 in a tubular housing 166. Under pressure of the oil the cylinder 162 slides and compresses spring 165 against the bottom of the tubular housing 166. The housing is retained in position by hook projections of three pivotal latches 167 each of which is mounted on its axle 168 and is loaded by spring 169. When the pressure of oil rises to a predetermined limit and spring 165 is compressed the tube housing 166 will be released, by the action of the projections 163 forcing the latches 167 out of engagement with housing 166. The tubular housing 166 together with the arms 148 will then be moved automatically by action of the spring 165 in new position (Fig. 17, dotted lines), changing simultaneously the position of valve 143 or 142 which is screwed firmly into the housing 166 by threads 170. The spring device 147 is pulled back as well during action of the device 141.

In addition to the automatic shifting of the valves described above, the change in position of valves may be checked and assisted, if desired, by hand operation of handles 83 and 84.

For propelling the machine backwards, when required, the hydraulic jacks are provided with spindle valves 171, 172, 173 and 174 (Fig. 13) by means of which bores 175 and 175a connecting hydraulic jack cylinders with conduit 136 may be closed and bores 176 and 176a connecting jack cylinders with conduit 140 may be opened. Thus the hydraulic jacks will then be wedged between the roof and floor of the seam on the opposite or retracting stroke of the rams 73 and 73a which will pull the machine backwards instead of pushing forward.

A hydraulic pump of any of the various well known types may be used in this machine, for example, a high speed eccentric pump with a plurality of radial pistons. This pump comprises an annular cylinder block 177 having several radial bores 178 with pistons 179 (Figs. 19 and 20). The pistons are operated by an eccentric roller ring 180 which is mounted on eccentric 181 of the driving shaft 67 journalled in antifriction bearings 182 and 183 and driven from motor shaft 54 (Fig. 1) by gears 65 and 66. The inside ends 184 of the pistons are held in stationary contact with ring 180 by means of intermediate pieces 185. During a revolution of the shaft 67 each piston makes one full reciprocating movement during which it sucks oil from annular suction port 186 through suction valve 187 and delivers into annular collecting passage 188, through delivery valve 189. Both delivery and suction valves 187 and 189 are of spring loaded ball type.

The annular suction passage 186 has its inlet conduit 190, and annular collecting passage 188 has its outlet or supply conduit 70.

The return stroke of each piston is ensured by a spring 191, which is held in position by screwed connection 192.

The whole pump is supported by feet 193 and 193a.

The combined shearing and loading machine of this invention can be used for mining coal and like minerals of strata structure deposited in seams of small to medium thickness, say from 1 foot 6 inches to 5 feet in cases where a single machine is used, and to about twice the said thickness in cases where an arrangement of two similar shearing and loading machines are used (Figs. 24 and 25).

The arrangement consists of mounting above one working machine 194, a second machine 195, by means of a supporting construction including a frame 196, which may be of an adjustable type, and two high brackets or props 197 and 198.

The vertical hydraulic props or jacks are connected together so that each pair of props 76 and 76a, as used in an ordinary machine, comprise a high prop 199 or 200 which can be varied in length to suit the heights of seams worked. The hydraulic systems of both machines are connected together and controlled by one automatic valve gear, as was described above, but each motor continues work independently and drives its own hydraulic pump and loading conveyor 201 or 202. The power is supplied to each motor through a cable 50 or 50a.

The upper machine 195 (Fig. 25) is situated one step ahead so that the coal sheared off by the upper machine from the upper bank of the seam is loaded separately by the upper loading conveyor 201. The upper conveyor 201 is similar to the lower one 202 but its discharging end 203 is not inclined, since the whole conveyor 201 is working at a higher level than face conveyor 204 upon which the coal is loaded by both loading conveyors.

By using the arrangement of two machines the full height of a thick seam may be worked at once and the centre dirt band 204 (if any) may remain untouched by the shearing blades 206 and 207 in a gap 208 which is left between the upper and lower shearing blades. It may then be broken down separately from the coal.

In cases where there is no dirt band in a thick seam the shearing blades 207 of the lower machine can be chosen higher by length of portions 209 to enable the full height of the seam to be worked. The machine of this invention, may be used in various well known systems of mining in seam beds having small pitch from flat to about 18°.

In cases where the machine as applied in the well known longwall mining (Fig. 21) a face may be equipped with two face conveyors 210 and 211 which are both discharging on to a gate conveyor 212 in the main gate road 213, which is protected as usual by gate packs 214 and 215.

The machine 220 (Fig. 21) in the position shown travels from the left hand to the right hand corner of the longwall face, and has just passed the gate conveyor 212. Thus the face conveyor 210 is not in operation and can be moved to a new position 216 (dotted lines). The gate packs 217 may also be extended and several rows of roof supporting props 218, which are nearest to the waste, may be withdrawn in the left hand side of the face to enable the roof to break down and cave in the goaf. 219.

After the machine has reached the right hand corner of the longwall face, it is turned through 90°, without any dismantling, and occupies position 220a (dotted lines). Several props 221 are to be set in a row along the machine side to support the machine against the shearing forces during starting. The additional shearing wedge 43 (Figs. 21 and 2) must also be attached to the shearing frame 1.

Then the machine works out a stable hole 221a loading the coal during this operation on to an intermediate short conveyor 222a extendable during machine operation. After the stable has been worked to the depth of the new strip 222, the three portions of the machine are disconnected and then re-assembled to suit left hand working in the new position 223.

At the same time, the second face conveyor 211 is to be moved over to new face and will occupy position 224. The machine then can commence working and travel in the opposite direction until it will reach the left hand corner of the longwall face, where all the operations described above are to be repeated and so on.

It is possible of course to drive by usual well known means a narrow heading in each corner advancing in front of the longwall face to accommodate the intermediate short conveyor 222a during working out the stable hole 221a. In this case the wedge 43 will not be required.

In the longwall face mining described, the machine is working in either direction of travel. It is possible, however, if desired, to haul the machine back along the face each time one corner of the longwall face is reached. After dismantling the three main portions can be coupled together to form a train and can be flitted to the starting position by a rope driven by an auxiliary hoist. Each of the three main portions or units is narrow enough to pass freely along the track 225 between the coal face and the first row of props. In this way the machine would always work in the same direction.

Two combined shearing and loading machines may be employed in a double unit longwall face. Cycles of operations of both machines can be displaced relatively to each other to overlap the coal-getting in each side of the double unit face and thus to achieve and guarantee a continuous coal flow from the face.

The machine of this invention may also be used in shortwall face mining, that is, in a room-and-pillar system and for driving entries and like heading chambers in a seam.

In cases where the length of a shortwall face, i. e. the width of a room or a chamber lies between 10 and 18 feet, a single machine can work the full width of the room (Fig. 23). In such a case one machine 226 shears off the coal from working face 227 in one operation and loads this on to conveyor 228 having its drive 229. The conveyor 228 is connected with machine 226 for simultaneous advance of the machine and the conveyor. The conveyor loads on to a room conveyor 230 by overlapping the latter to some extent. The room conveyor 230 which is of an extendable type and has its own drive 231, conveys the coal along the room and loads into pit cars 232 or other haulage or conveying means.

In cases where the width of a room or chamber is within limits of 15 to 35 feet there can be employed two machines 233 and 234 (Fig. 22) one arranged for right hand and the second for left hand working. Both machines working simultaneously shear off the coal from the entire face 235 and load it upon conveyor 236 having its own drive 237. The conveyor 236 is advanced either by machine 233 or 234 and loads on to room conveyor 238 having its own drive 239 and located near the middle of the room. The room conveyor 238 loads into pit cars 240 or other conveying means in the main haulage road.

I am aware that prior to my invention there was already known the use of hydraulic jacks and hydraulic rams for propelling machines during the mining of coal and other minerals, and also for the operating of shearing wedges.

There was also well known, prior to my invention, power loading machines and combined coal-cutting and loading machines for mining coal and other minerals having a driving motor and an endless chain scraper loader with a chain of universal joint type and fitted with cantilever scraper flights, adapted to load the separated coal on to a face conveyor.

Therefore, I do not claim a combined coal separating and loading machine broadly, but what I claim is:

1. In a combined shearing and loading machine for mining coal and like minerals, a pivotally mounted arm located within one of two forward corners of the complete machine structure, power transmitting means to swing said arm in a substantially horizontal plane, one substantially vertical wedge shaped shearing edge, attached to a lug at an extremity of said arm and adapted to shear off by direct thrust a sickle shaped paring from the full height of the seam in an inner corner formed by a side wall of a solid seam and the front of a working face, a rigid frame slidably mounted in the forward portion of the machine structure, power driven means to reciprocate said frame in a horizontal plane across the machine, said reciprocating means being positively connected with said swinging means to swing the arm synchronously with the reciprocation of said frame, several spaced substantially vertical wedge shaped shearing edges attached to the lugs of said frame, projecting in the front of the machine structure and adapted to shear off by direct thrust a corresponding number of parings from the whole front of the working face during the stroke of said reciprocation which is directed away from said side wall of the working face, a substantially vertical rigid plate forming a foot for said reciprocating means and comprising a continuation of one side surface of the machine body to thrust upon said side wall for supporting the machine against the shearing forces.

2. The combination of two similar combined shearing and loading machines for mining coal and the like minerals each machine including a pivotally mounted arm, power transmitting means to swing said arm in a horizontal plane, one substantially vertical wedge shaped shearing edge attached to a lug at an extremity of said arm, a rigid frame slidably mounted in the forward portion of the machine structure, several spaced substantially vertical wedge shaped shearing edges attached to the lugs of said frame and projecting in the front of the machine structure, power driven means to reciprocate said frame in the horizontal plane across the machine, said reciprocating means being positively connected with said swinging means to swing the arm synchronously with the reciprocation of said frame, a supporting construction including a frame and several prop structures for mounting one of said two machines above the other to work simultaneously and separately upon the upper and the lower bank of a mine seam with a gap between said lower and upper machines to omit a centre dirt band included in the seam and to leave said dirt band as waste in the room of the worked out seam, means including one pair of vertically arranged extendable props to wedge between the floor and the roof of the seam for simultaneous propelling of both said machines during the mining process.

3. In a combined shearing and loading machine, the shearing mechanism comprising an arm pivotally mounted on a substantially vertical axle to swing in a horizontal plane, said arm being located within one of the two forward corners of the complete machine structure, one substantially vertical shearing edge attached to a lug at an extremity of said arm, said edge extending from the floor level to a height above the machine body, a rigid frame slidably mounted in the forward portion of the machine structure, several spaced substantially vertical shearing edges each attached to a lug of said frame, and each projecting in the front of the machine structure, said edges extending from the floor level to substantially the same height as said pivotal shearing edge; each said shearing edge comprising several super-posed detachably mounted wedge-shaped tool elements, power driven means to reciprocate said frame in a horizontal plane across the machine, a chain cable anchored by one end to said arm at a point between its pivot axle and the extremity, said cable being secured by the second end to said frame for pivoting said arm in a forward direction through pull of said cable during a forward stroke of said frame, a contour profile formed on said frame and adapted to thrust against rollers attached to said arm for pivoting said arm back during a back stroke of said frame.

4. A combined shearing and loading machine for mining coal and like minerals comprising in combination, a shearing mechanism incorporated in the forward portion of the machine structure and forming one separable unit having a horizontal plane of symmetry, said mechanism comprising a pivotally mounted arm located within one of the two forward corners of the complete machine structure, said arm having a lug at an extremity for attaching several wedge shaped tool elements to form a substantially vertical shearing edge, power transmitting means to swing said arm in a horizontal plane, a rigid frame slidably mounted in said forward portion, said frame having several lugs projecting in front of the machine structure and each adapted for attaching several wedge shaped tool elements to form a substantially vertical shearing edge at each lug, power driven means for reciprocating said frame horizontally across the machine, said reciprocating means being connected positively with said swinging means to swing said arm synchronously with the reciprocation of said frame; said machine comprising also a loading mechanism forming another separable unit having a vertical plane of symmetry, said loading mechanism including a conveyor comprising an elongated frame, an endless scraper chain and a driving gearing; said machine comprising also a driving and propelling means forming still another separable unit having a vertical plane of symmetry, said driving and propelling means including a machine propelling mechanism, a driving motor, a housing forming an oil tank and containing a hydraulic pump driven by said motor, and a valve gear, said three separable units of the complete machine structure being provided with means including several wedges and slots to receive said wedges and being adapted for fitting together in two ways relatively to their said individual planes of symmetry to adapt the complete machine structure for either a right hand or a left hand working face in the mine.

5. In a combined shearing and loading machine, the hydraulic valve gear, said valve gear comprising a pair of identical reversing valves of the sliding piston type, both said valves being supplied with hydraulic liquid under pressure in parallel, one of said valves being arranged to control extension and retraction of several double acting and interconnected hydraulic rams in a group, and the other valve being arranged to control extension and retraction of a separate double acting ram, each said valve having a valve-rod secured to a tubular housing of an automatic valve shifting device, each said device comprising a hydraulic plunger fixed immovable inside said housing, a hydraulic cylinder carrying a compression spring and fitted slidably on said plunger, said cylinder having an abutting collar to compress said spring against bottom of said housing by hydraulic pressure admitted in the cylinder, several pivotal latches adapted to engage said housing by hook projections, to retain in position and to disengage said housing through an action of projections provided on said cylinder and when said spring is compressed, said housing being then movable axially for an automatic shifting a corresponding valve under force of said spring, said shifting device of said valve controlling said rams in a group being communicated continuously through a hydraulic conduit with the retraction side of said rams in a group to shift said valve into the position for extension when the hydraulic pressure has risen to a predetermined limit, and said shifting device of the valve controlling said separate ram being communicated continuously through another hydraulic conduit with the extension side of said rams in a group to shift said valve into the position for extension when the hydraulic pressure has risen to a predetermined limit.

6. The valve gear of claim 5, in a combined shearing and loading machine, said valve gear including also a third valve shifting device comprising a tubular housing having two extension lugs to engage both piston valves of the gear simultaneously, said housing containing a central bolt slidable axially and carrying a compression spring, said bolt having an abutting collar for said spring, a cable secured by one end to said bolt and attached drivingly by the second end to a movable member interconnected with the separate ram of the machine to pull said cable for compressing said spring against bottom of said housing when said separate ram is extended, a transverse plunger latch adapted to engage said housing to retain in position and to disengage said housing through an action of a projection provided on said bolt and when said spring has been compressed, said housing being then movable axially under force of said spring for an automatic shifting both said valves simultaneously into the position for retraction of all hydraulic rams of the machine.

JULIUS YARMAK.

References Cited in the file of this patent

UNITED STATES PATENTS

| Number | Name | Date |
|---|---|---|
| 54,833 | Locke et al. | May 15, 1866 |
| 550,895 | McKinlay | Dec. 3, 1895 |
| 1,257,582 | Conrad et al. | Feb. 26, 1918 |
| 1,284,174 | Berkey | Nov. 5, 1918 |

FOREIGN PATENTS

| Number | Country | Date |
|---|---|---|
| 18,516 | Great Britain | Aug. 10, 1897 |
| 117,552 | Great Britain | of 1918 |
| 621,120 | Germany | Nov. 9, 1935 |